United States Patent [19]

Figueroa et al.

[11] 4,360,246
[45] Nov. 23, 1982

[54] INTEGRATED WAVEGUIDE AND FET DETECTOR

[75] Inventors: Luis Figueroa, Woodland Hills; Charles W. Slayman, Newbury Park; Huan-Wun Yen, Westlake Village, all of Calif.

[73] Assignee: Hughes Aircraft Company, Culver City, Calif.

[21] Appl. No.: 152,977

[22] Filed: May 23, 1980

[51] Int. Cl.³ .............................................. G02B 5/174
[52] U.S. Cl. .............................. 350/96.12; 350/96.14; 357/30
[58] Field of Search ............... 350/96.11, 96.12, 96.14; 357/16, 30

[56] References Cited

U.S. PATENT DOCUMENTS 3,833,435  9/1974  Logan et al. ........................... 156/11
3,990,775 11/1976  Kaminow et al. ................. 350/96.14
4,054,363 10/1977  Suematsu ........................... 350/96.11

OTHER PUBLICATIONS

*Applied Physics Letters*, vol. 36, No. 2, Jan. 15, 1980, pp. 149–151, J. C. Gammel et al., "An Integrated Photoconductive Detector and Waveguide Structure".

*IEEE Journal of Quantum Electronics*, vol. QE-15, No. 2, Feb. 1979, pp. 72–82, James L. Merz et al., "GaAs Integrated Optical Circuits by Wet Chemical Etching".

*Primary Examiner*—John D. Lee
*Assistant Examiner*—Frank Gonzalez
*Attorney, Agent, or Firm*—David W. Collins; W. H. MacAllister; A. W. Karambelas

[57] ABSTRACT

A GaAs FET structure with a high electric field region, or active region, contacted by source, gate and drain electrodes is provided which can be used for high speed optical detection or for microwave oscillator optical injection locking. The device provides for efficient coupling of incident optical radiation into the active region, employing confinement and waveguiding regions lying in the plane of the device and adapted to guide incident optical radiation to the active region. GaAs photoconductors are also provided by eliminating the gate electrode.

23 Claims, 3 Drawing Figures

INTEGRATED WAVEGUIDE AND FET DETECTOR

The Government has rights in this invention pursuant to Contract No. N00173-78-C-0192 awarded by the Department of the Navy.

BACKGROUND OF THE INVENTION

1. Field of the Invention

The invention relates to a GaAs FET structure with a high electric field region which can be used for high speed optical detection or for microwave oscillator optical injection locking. More particularly, the invention relates to a device configured such that optical radiation is efficiently coupled into the high electric field region.

2. Description of the Prior Art

Gallium arsenide field effect transistors (FET's) are well known; see, e.g., Vol. 24, Institute of Electrical and Electronic Engineers, Transactions on Microwave Theory and Techniques, pp. 279-300 (1976). However, these devices are designed for optimal microwave performance only. Therefore, they are not necessarily suitable for efficient optical coupling.

Other investigators have employed conventional FET's as optical detectors; see, e.g., Technical Digest, Electron Devices Meeting, pp. 120-123 (1978), Vol. 13, Electronics Letters, p. 193, (Mar. 15, 1977), Vol. 36, Applied Physics Letters, pp. 149-151 (1980) and Vol. 19, Japanese Journal of Applied Physics, pp. L27-L29 (1980). However, these FET's also were optimized only for microwave performance.

SUMMARY OF THE INVENTION

In accordance with the invention, an integrated optical photodetector comprises:

(a) a substrate of semi-insulating III-V semiconductor material;

(b) a confinement region of mixed III-V semiconductor material on at least a portion of the substrate;

(c) a waveguiding region of mixed III-V semiconductor material supported on the confinement region and adapted to receive and guide incident optical radiation; and (d) at least one detector supported on at least a portion of the waveguiding region and adapted to receive guided optical radiation. The detector includes an active region of III-V semiconductor material and a pair of electrodes contacting the active region.

The device is fabricated by a process comprising:

(a) forming a confinement region of mixed III-V semiconductor material on at least a portion of a substrate of semi-insulating III-V semiconductor material;

(b) forming a transverse waveguiding region of mixed III-V semiconductor material on the confinement region;

(c) forming a lateral waveguiding region in the transverse waveguiding region; and (d) forming at least one detector associated with the waveguiding region by a process which includes (i) forming an active region of III-V semiconductor material on at least a portion of the optical waveguide, and (ii) forming a pair of electrodes in contact with the active region.

The device of the invention permits efficient coupling of incoming optical radiation into the active region along the plane of the device, thereby optimizing optical characteristics.

DETAILED DESCRIPTION OF THE INVENTION

The discussion that follows relates specifically to GaAs devices including mixed (AlGa)As regions, useful for high speed optical detection, for microwave oscillator optical injection locking and other microwave-optical interactions. Such GaAs devices typically operate at an optical wavelength of about 0.6 to 0.9 $\mu$m and at microwave frequencies ranging up to at least about 5 GHz. However, it will be understood that the invention is suitable for other III-V devices such as InP, used in similar applications but in a different optical wavelength range (about 1 to 1.5 $\mu$m for InP).

Figure 1:
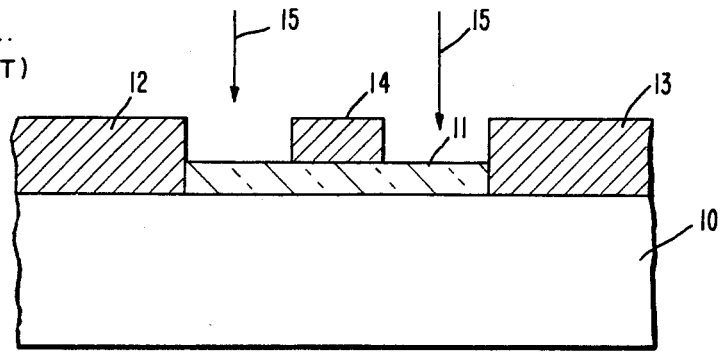
FIG. 1 is a cross-sectional view of a GaAs FET in accordance with the prior art.

In order to achieve optical injection locking, mixing and high speed detection using GaAs FET amplifiers, or oscillators, it is desired to improve the optical coupling efficiency of GaAs FET's. FIG. 1 depicts a conventional GaAs FET structure. The structure comprises a semi-insulating substrate 10, such as GaAs, typically having a resistivity of about $10^7$ ohm-cm. The substrate supports an active region 11 of typically III-V semiconductor material, here, n-GaAs doped to about $10^{17}$/cm$^3$ and having a thickness ranging from about 0.5 to 1 $\mu$m. The purpose of the active region is to provide a region for the generation and control of carriers. Electrodes 12 and 13 are in direct contact with the active region. For an FET device, electrodes 12 and 13 serve as source and drain regions, respectively, and gate electrode 14 contacts a portion of active region 11 and is spaced apart from the source and drain electrodes. In the case of a photoconductor, gate electrode 14 would be absent. In either case, the front side of the device is illuminated by optical radiation 15.

The prior art devices operated through the photoconductive process by which injected photons produce a change in the conductivity of the active layer. This results in an induced photoconductive current.

The disadvantage with prior art FET's is the small active area available for optical absorption due to the presence of gate electrode 14. This is especially true for FET's with a short channel length (the distance between electrodes 12 and 13).

Figure 2:
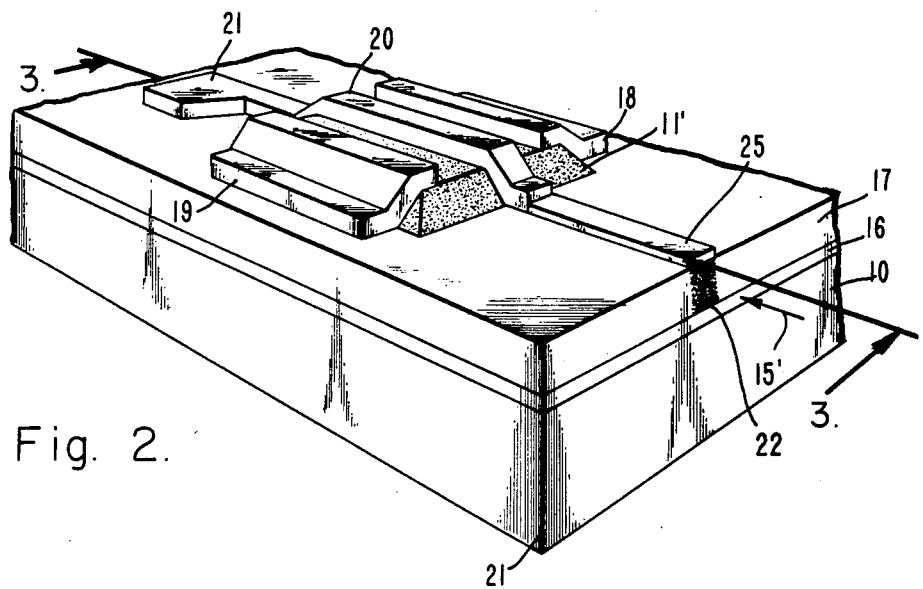
FIG. 2 is a perspective view of a GaAs FET in accordance with the invention.
Figure 3:
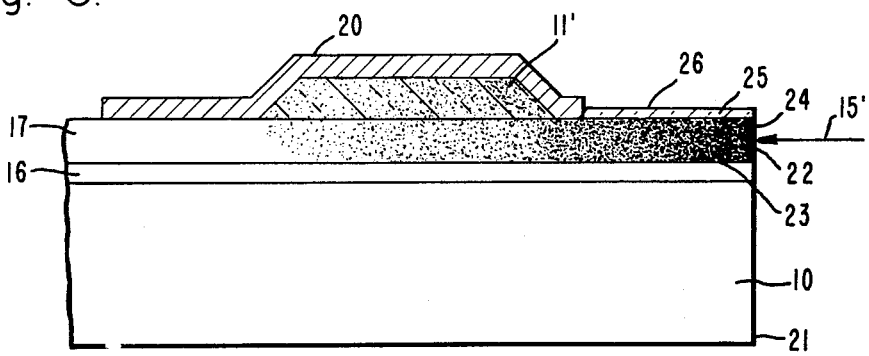
FIG. 3 in cross-section depicts a portion of the GaAs device of FIG. 2 along 3—3.

In accordance with the invention, an FET structure with improved optical coupling efficiency is provided. The structure is depicted in FIGS. 2 and 3, which show a substrate 10 as in FIG. 1 of semi-insulating GaAs. The substrate supports a confinement region 16 of undoped gallium aluminum arsenide (Al$_x$Ga$_{1-x}$As), which in turn supports a waveguiding region 17 of undoped gallium aluminum arsenide (Al$_y$Ga$_{1-y}$As). The composition of the two regions is adjusted such that optical radiation is not permitted to leak out of region 17 until the optical wave reaches active region 11'. Active region 11' is formed on at least a portion of the waveguiding region. Optical radiation 15' enters from side 21 of the device and is guided along the plane of the device to the active region through a portion 22 of waveguide region 17.

The layers comprising confinement region 16, waveguiding region 17 and active region 11' are conveniently successively formed by liquid phase epitaxial (LPE) growth, employing well-known growth conditions. The LPE growth conditions of these layers form no part of this disclosure and hence are not described here.

The FET electrode pattern is defined as usual to form source 18, drain 19 and gate 20 electrodes, together with gate contact pad 21. The mesa configuration depicted in FIG. 2 is exemplary only; planar configurations may also be used with suitable modifications.

The composition of the confinement region 16 is given as $Al_xGa_{1-x}As$, where x is at least 0.42. The value of x should be high enough to produce an indirect gap, since this in turn produces a lower conductivity, thus minimizing leakage current. On the other hand, x should not be too high, since such compositions are difficult to grow; values of x greater than about 0.7 evidence such growth problems. Preferably, x ranges from about 0.42 to 0.55, and most preferably is about 0.45.

The thickness of the confinement region is not critical, since it is not necessary for support. It is desired that this region be as thin as possible, but not so thin as to permit optical radiation to leak out. Accordingly, a thickness of about 0.5 to 1 μm is desirably employed.

The composition of the waveguiding region 17 is given as $Al_yGa_{1-y}As$, where y is about 5 to 10% less than x, or about 0.37 to 0.65. This difference in x and y is chosen so as to form an optical waveguide 22 in region 17, as discussed below. Preferably, y ranges from about 0.37 to 0.50, and most preferably is about 0.40 to 0.43 when x is about 0.45.

The thickness of the waveguiding region required in order to couple optical radiation into the device depends on the difference in the refractive indexes of the waveguiding and confining layers. For a 5% difference in the index of refraction, the thickness should be at least about 1 μm. If the thickness is too great, however, the device leakage current may be too high and may prevent pinch-off of the FET and reduce the efficiency of the detector. Accordingly, the thickness of the waveguiding region should not exceed about 5 μm and preferably ranges from about 2 to 5 μm.

While the invention has been described in terms of forming confinement and waveguiding regions by forming layers 16 and 17, respectively, of mixed (AlGa)As compositions, it should be understood that other processes of forming these regions are also contemplated as being within the scope of the invention. Examples of such processes include diffusion of appropriate materials and ion implantation.

Optical waveguiding through portion 22 is accomplished by two aspects, (a) one providing waveguiding in the transverse direction and (b) one providing waveguiding in the lateral direction. The waveguiding in the transverse direction is simply accomplished by the difference in the aluminum content of the undoped, grown layers (16 and 17). It is well-known that the index of refraction, n, of $Al_xGa_{1-x}As$ decreases with increasing values of x. Typically, the index of refraction can be determined by $$n = 3.6 - 0.6(x).$$

Thus, optical radiation is confined in portion 22 of region 17 by the difference in index of refraction at waveguide/confinement interface 23 and at waveguide/oxide interface 24.

The waveguiding in the lateral direction can be accomplished by one of several techniques. In one technique, a pattern of GaAs mesas (active region 11') is defined on the GaAs wafer which consists of substantially square islands. The islands are masked with photoresist. These islands are etched using a selective etchant [that is, an etchant which etches only GaAs and not (AlGa)As]. A suitable etchant is superoxol, which comprises a solution of ammonium hydroxide ($NH_4OH$) and hydrogen peroxide ($H_2O_2$) having a pH of about 8.5. The islands are etched down to the $Al_yGa_{1-y}As$ layer (17). If the value of y is greater than about 0.37, an oxide is rapidly formed on the $Al_yGa_{1-y}As$ surface. After this mesa etching step, a lateral optical waveguide 22 is created which is aligned with the position of gate electrode 20 to be subsequently deposited, as described below and as shown in FIG. 2. This waveguide is created by selectively etching the oxide which forms on the $Al_yGa_{1-y}As$ surface, leaving oxide strip 25. A convenient such etchant is AZ photoresist developer, available from Shipley Co. (Newton, MA), which also prevents oxide regrowth. Since the oxide has an index of refraction of about 2, a strip-loaded optical waveguide 22 is formed. The oxide 25 remaining over layer 17 is usually less than about 1,000 Å in thickness. While strip 25 is depicted in FIG. 3 as being an oxide, it may comprise other materials which serve the same purpose, such as (AlGa)As.

Other methods of forming lateral optical waveguide 22 include:

(1) Rather than using the natural oxide on the surface of $Al_yGa_{1-y}As$, that oxide is stripped away, and a controlled thickness of $SiO_2$ is deposited, such as by sputtering. This allows more precise control of oxide thickness and composition. The oxide can then be etched by using buffered HF solution. A typical oxide thickness is about 2,000 Å.

(2) A strip, aligned with the position of the gate electrode to be deposited, is masked and etched in region 17, using a selective etchant that etches $Al_yGa_{1-y}As$ and not GaAs. One such etchant is HF solution. A typical etching thickness would be about 2,000 Å. Optical radiation is confined in portion 22 by the difference in index of refraction at the waveguide/air interface (not shown).

The thickness of the active region 11' ranges from about 0.1 to 1 μm for transverse absorption. The thickness depends on whether pinch-off is desired. Lower thickness values permit pinch-off, which is desired if one wishes to operate the FET detector in a low noise region [i.e., the shot noise will be proportional to the drain-source current; see, e.g., Vol. 24, IEEE-MTT, pp. 279–300 (1976)]. Preferably, the thickness of the active region ranges from about 0.1 to 0.5 μm.

The source and drain contacts (electrodes 18 and 19) are conveniently formed by depositing layers of gold-germanium (typically about 88%Au—12%Ge), nickel and gold, followed by heat treating, and gate contact (electrode 20) and contact pad 21 are formed by depositing aluminum. These depositions are well-known in the art and form no part of this invention. If a mesa geometry is desired, the active region is selectively etched to form the desired configuration prior to contact formation. A selective etchant such as superoxol is employed, as is well known.

While only one device is depicted in FIGS. 2 and 3, it will be understood that a plurality of devices are fabricated on the substrate. The finished devices may be separated into individual detectors, as by slicing and dicing the substrate, employing well-known techniques, or formed into one or two-dimensional arrays of detectors by suitable interconnection.

The FET detector functions like a photoconductor except that (1) the gate can control dark current and (2) the generation of carriers can change the depletion layer width, thus changing the drain-source current. Further, phototransistor action may be achieved by connecting a resistor (not shown) in series with the gate. Thus, if the gate acts as a photodiode, a voltage is induced across the gate and a corresponding change in the drain-source current occurs.

The principal of operation is as follows: optical radiation 15' enters the optical waveguide 22 from side 21 which has been cleaved. The optical radiation is guided in the transverse direction by the index steps produced by the different aluminum contents in the respective (AlGa)As regions 16 and 17 and in the lateral direction by the strip-loading structure 25 on the waveguide region 17, as described above. The light continues until it reaches the detector, where the light from the optical waveguide 22 begins to couple into the GaAs active region 11'. The coupling is achieved because the index of refraction of GaAs is higher than that of (AlGa)As. The light which is coupled generates carriers which in turn produce a current.

The foregoing discussion has been concerned with employing an FET in conjunction with light detection. A photodetector may alternatively be employed, using electrodes 18 and 19 and omitting gate electrode 20 and contact pad 21. Such photodetectors function as a photoconductor. The photoconductivity is changed by incident optical radiation and thus an induced current is generated.

While the FET and the photodetector structures are per se well-known, it is the combination of these structures with light detection and the geometry employed that is considered novel.

In the structure of the invention, the waveguiding region has several functions: (a) it serves as the guiding region between the cleaved edge and the FET or photodetector, (b) it serves as an optical window, (c) it serves as the stop for the selective etching process during fabrication, and (d) it serves to confine carriers in the GaAs active layer. The purpose of the confining region is to confine the optical radiation to the waveguide region. The main advantages of this structure are (1) simplicity of fabrication, (2) use of planar technology, and (3) potential for integrating FET or photodetector technology with GaAs opto-electronic devices. The added (AlGa)As regions should not have any significant adverse effect on the FET or photodetector operation. The main criterion for the properties of these regions is that the conductivity must be low in order to prevent leakage current. This is easily accomplished by not doping the regions and by using an aluminum content greater than about x=0.37.

EXAMPLES

Devices substantially as depicted in FIGS. 2 and 3 were prepared on a wafer. The drain-source spacing was 10 μm. The active region (n-type) was doped (Sn) to about $10^{17}/cm^3$. The mobility in this region was about 3,500 cm$^2$/V-sec. The thickness of the active region varied from 0.2 to 0.5 μm.

The confinement layer 16 was undoped $Al_{0.45}Ga_{0.55}As$, 1 μm thick, while the waveguiding layer 17 was undoped $Al_{0.4}Ga_{0.6}As$, 2 μm thick. These layers were formed by conventional liquid phase epitaxial growth, employing a sliding graphite boat and a temperature of about 830° C. and a cooling rate of 0.5° C./min.

Source and drain contacts 18 and 19 were formed by evaporating 88%Au—12%Ge (1,500 Å), Ni (1,000 Å) and Au (2,000 Å), followed by heat treating at 460° C. for 30 sec. The gate contact 20 and contact pad 21 were formed by evaporating Al (2,000 Å).

One device evidenced a DC light sensitivity ranging from 2 to 5 mA/mW, with RF cut-off frequency of at least 4 GHz; the RF sensitivity was 0.03 to 0.1 mA/mW. The electrical properties of several devices on the wafer were as follows: The drain-source current, $I_{DS}$, ranged from 3 to 7 mA; the drain-source voltage, $V_{DS}$, ranged from 2 to 5 V; the transconductance, $g_m$, ranged from 1 to $2\times10^{-3}$ mho; and the gate voltage, $V_G$, ranged from 0 to $-5$ V.

What is claimed is:

1. A monolithic integrated optical photodetector comprising:
    (a) a substrate of semi-insulating III–V semiconductor material;
    (b) a confinement region of mixed III–V semiconductor material on at least a portion of said substrate;
    (c) a waveguiding region of mixed III–V semiconductor material supported on said confinement region and adapted to receive and guide incident optical radiation; and
    (d) at least one detector supported on at least a portion of said waveguiding region and adapted to receive guided optical radiation, said detector including an active region of III–V semiconductor material supported on said waveguiding region and a pair of electrodes contacting said active region.

2. The device of claim 1 comprising:
    (a) a substrate of semi-insulating GaAs;
    (b) a confinement region of undoped $Al_xGa_{1-x}As$ supported on at least a portion of said substrate, where x is at least about 0.42;
    (c) a transverse waveguiding region of undoped $Al_yGa_{1-y}As$ supported on said confinement region, where y is at least about 0.37 and is about 5 to 10% less than x;
    (d) means for confining incident optical radiation in the lateral direction; and
    (e) at least one detector supported on at least a portion of said waveguiding region, including
        (i) an active region of n-type GaAs, and
        (ii) a pair of electrodes contacting said active region.

3. The device of claim 1 or 2 further comprising a gate electrode contacting a portion of said active region, said gate electrode spaced apart from said pair of electrodes.

4. The device of claim 2 in which x ranges from about 0.42 to 0.70 and y ranges from about 0.37 to 0.65.

5. The device of claim 4 in which x ranges from about 0.42 to 0.55 and y ranges from about 0.37 to 0.50.

6. The device of claim 5 in which x is about 0.5 and y is about 0.40 to 0.43.

7. The device of claim 2 in which the thickness of said confinement region ranges from about 0.5 to 1 μm.

8. The device of claim 2 in which the thickness of said transverse waveguiding region ranges from about 1 to 5 μm.

9. The device of claim 8 in which the thickness of said transverse waveguiding region ranges from about 2 to 5 μm.

10. The device of claim 2 in which the thickness of said active region ranges from about 0.1 to 1 μm.

11. The device of claim 10 in which the thickness of said active region ranges from about 0.1 to 0.5 μm.

12. The device of claim 2 wherein said lateral confining means comprises a strip supported on said transverse waveguiding region.

13. A process for fabricating a monolithic integrated optical photodetector on a substrate of semi-insulating III-V semiconductor material comprising:
   (a) forming a confinement region of mixed III-V semiconductor material on at least a portion of said substrate;
   (b) forming a transverse waveguiding region of mixed III-V semiconductor material on said confinement region;
   (c) forming a lateral waveguiding region in said transverse waveguiding region; and
   (d) forming at least one detector associated with said waveguiding region by a process including
      (i) forming an active region of III-IV semiconductor material on at least a portion of said optical waveguide, and
      (ii) forming a pair of electrodes in contact with said active region.

14. The process of claim 13 comprising:
   (a) forming on a substrate of semi-insulating GaAs a confinement region of undoped $Al_xGa_{1-x}As$, where x is at least about 0.42;
   (b) forming on said confinement region a transverse waveguiding region of undoped, $Al_yGa_{1-y}As$, where y is at least about 0.37 and is about 5 to 10% less than x;
   (c) forming a lateral waveguiding region in said transverse waveguiding region; and
   (d) forming at least one detector associated with said waveguiding region by a process including
      (i) forming an active region of n-type GaAs on at least a portion of said optical waveguide, and
      (ii) forming a pair of electrodes in contact with said active region.

15. The process of claim 13 or 14 in which a gate electrode is formed on a portion of said active region, said gate electrode spaced apart from said pair of electrodes.

16. The process of claim 14 in which x ranges from about 0.42 to 0.70 and y ranges from about 0.37 to 0.65.

17. The process of claim 16 in which x ranges from about 0.42 to 0.55 and y ranges from about 0.37 to 0.50.

18. The process of claim 17 in which x is about 0.5 and y is about 0.40 to 0.43.

19. The process of claim 14 in which the thickness of said confinement region ranges from about 0.5 to 1 μm.

20. The process of claim 14 in which the thickness of said transverse waveguiding region ranges from about 1 to 5 μm.

21. The process of claim 20 in which the thickness of said waveguiding region ranges from about 2 to 5 μm.

22. The process of claim 14 in which the thickness of said active region ranges from about 0.1 to 1 μm.

23. The process of claim 22 in which the thickness of said active region ranges from about 0.1 to 0.5 μm.

* * * * *